United States Patent
Vorobev et al.

(10) Patent No.: US 10,102,292 B2
(45) Date of Patent: Oct. 16, 2018

(54) METHOD AND SYSTEM OF PROCESSING A SEARCH QUERY

(71) Applicant: YANDEX EUROPE AG, Lucerne (CH)

(72) Inventors: Aleksandr Leonidovich Vorobev, Krasnogorsk region (RU); Pavel Viktorovich Serdyukov, Moscow (RU); Damien Raymond Jean-François Lefortier, Moscow (RU); Gleb Gennadievich Gusev, Moscow (RU)

(73) Assignee: Yandex Europe AG, Lucerne (CH)

( * ) Notice: Subject to any disclaimer, the term of this patent is extended or adjusted under 35 U.S.C. 154(b) by 234 days.

(21) Appl. No.: 15/156,399

(22) Filed: May 17, 2016

(65) Prior Publication Data

US 2017/0140053 A1 May 18, 2017

(30) Foreign Application Priority Data

Nov. 17, 2015 (RU) ................................. 2015149288

(51) Int. Cl.
  *G06F 17/30* (2006.01)
  *G06N 99/00* (2010.01)
(52) U.S. Cl.
  CPC .... *G06F 17/30867* (2013.01); *G06F 17/3053* (2013.01); *G06F 17/30687* (2013.01); *G06N 99/005* (2013.01)
(58) Field of Classification Search
  CPC ........... G06F 17/3035; G06F 17/30867; G06F 17/30646; G06F 17/305; G06F 17/30687
  USPC ............................ 707/725, 729, 710; 706/12
  See application file for complete search history.

(56) References Cited

U.S. PATENT DOCUMENTS

| | | | |
|---|---|---|---|
| 7,974,974 B2 * | 7/2011 | Tankovich | G06F 17/3053 706/12 |
| 8,244,517 B2 | 8/2012 | Roy et al. | |
| 8,886,641 B2 * | 11/2014 | Dong | G06F 17/30867 707/725 |
| 2008/0140699 A1 * | 6/2008 | Jones | G06F 17/30646 |

(Continued)

FOREIGN PATENT DOCUMENTS

RU 23659984 C2 8/2009

OTHER PUBLICATIONS

Hofmann et al., Balancing Exploration and Exploitation in Learning to Rank Online, ISLA, University of Amsterdam.

(Continued)

*Primary Examiner* — Jean M Corrielus
(74) *Attorney, Agent, or Firm* — BCF LLP

(57) ABSTRACT

There is disclosed a computer implemented method for processing a search query, the method executable by a search engine server, search engine server coupled to a crawled web resource database and a communication network. The computer implemented method aims at placing lower ranked web resources (for example, due to lack of prior user interaction with these web resources, as they may be new, etc) on the upper positions of the SERP to attract more user feedback to gather information about the lower ranked web resources. In this way, the search engine provider may improve the search results mix by giving a chance to get user feedback (and, hence, improve their scores) for more potentially highly relevant web resources (which may yet lack user interaction data to allow proper high scoring).

20 Claims, 5 Drawing Sheets

(56) References Cited

U.S. PATENT DOCUMENTS

| | | | |
|---|---|---|---|
| 2009/0240680 A1* | 9/2009 | Tankovich | G06F 17/3053 |
| 2010/0257164 A1 | 10/2010 | Halverson et al. | |
| 2011/0093459 A1* | 4/2011 | Dong | G06F 17/30867 |
| | | | 707/725 |
| 2011/0196733 A1 | 8/2011 | Li et al. | |
| 2011/0246457 A1* | 10/2011 | Dong | G06Q 10/06 |
| | | | 707/725 |
| 2011/0264639 A1 | 10/2011 | Slivkins et al. | |
| 2011/0264660 A1* | 10/2011 | Tankovich | G06F 17/3053 |
| | | | 707/729 |
| 2012/0011112 A1* | 1/2012 | Bian | G06F 17/30864 |
| | | | 707/723 |
| 2012/0030152 A1* | 2/2012 | Pueyo | G06F 17/30867 |
| | | | 706/12 |
| 2012/0158685 A1* | 6/2012 | White | G06F 17/30867 |
| | | | 707/706 |
| 2012/0317104 A1* | 12/2012 | Radlinski | G06F 17/30867 |
| | | | 707/724 |
| 2014/0280548 A1 | 9/2014 | Langlois et al. | |
| 2014/0344230 A1 | 11/2014 | Krause et al. | |
| 2014/0344306 A1 | 11/2014 | Bowden et al. | |
| 2015/0095271 A1 | 4/2015 | Ioannidis et al. | |
| 2015/0161268 A1* | 6/2015 | Dasher | G06F 17/30867 |
| | | | 707/728 |
| 2015/0286686 A1 | 10/2015 | Boley et al. | |
| 2016/0055252 A1* | 2/2016 | Makeev | G06F 17/3053 |
| | | | 707/733 |
| 2016/0299899 A1* | 10/2016 | Logachev | G06F 17/30867 |
| 2017/0061528 A1* | 3/2017 | Arora | G06Q 30/08 |

OTHER PUBLICATIONS

Vorobev et al., Gathering Additional Feedback on Search Results by Multi-Armed Bandits with Respect to Production Ranking, WWW 2015, May 18-22, 2015, Florence, Italy, pp. 1177-1187.

Yue et al., Interactively Optimizing Information Retrieval Systems as a Dueling Bandits Problem, Proceedings of the 26 th International Conference on Machine Learning, Montreal, Canada, 2009, 8 pages.

Radlinski et al., Learning Diverse Rankings with Multi-Armed Bandits, Proceedings of the 25 th International Confer-ence on Machine Learning, Helsinki, Finland, 2008, 8 pages.

Russian Search Report dated Nov. 7, 2016 for Russian patent application No. 2015149288.

* cited by examiner

METHOD AND SYSTEM OF PROCESSING A SEARCH QUERY

CROSS-REFERENCE

The present application claims priority to Russian Patent Application No. 2015149288, filed Nov. 17, 2015, entitled "METHOD AND SYSTEM OF PROCESSING A SEARCH QUERY", the entirety of which is incorporated herein by reference.

FIELD

The present technology relates to a method of processing a search query.

BACKGROUND

A typical prior art search system is configured to receive a search query form a client's computing device and to apply a ranking model that aggregates both pre-feedback features describing the content of web pages and prior-history features based on user behavior data stored in query logs do determine one or more web pages to be presented as responsive to the search query in a form of a Search Engine Results Page (SERP).

This leads to the following iterative process of interaction with users that repeatedly submit a particular query (albeit from different users). At the first stage, when the query is relatively new to the system, the search engine ranks web resources by the scores using their pre-feedback information only. Further at the second stage, it corrects this ranking with collected implicit feedback data. During this stabilizing phase, scores of top ranked web resources which get negative user feedback become lower, so these web resources are exchanged with other web resources with high pre-feedback based scores. After the ranking algorithm found enough web resources getting mostly positive user feedback, the ranking is not being changed anymore by two reasons: first, the ranking algorithm continues to receive only redundant confirmation of the top web resources' relatively high relevance, and, second, no web resources lacking prior-history features have scores higher than those which were lucky to get some.

That being said, pre-feedback information cannot fully reflect all the aspects of the web resources that potentially impact user satisfaction. Therefore, despite the fact that some web resources lacking user feedback can be more relevant than those ranked higher, these web resources are hardly displayed to the user performing a search.

Thus, the inaccurate display of search results can increase the repeated searches of the user, consequently resulting in increased consumption of energy and increased consumption of bandwidth.

US2011/0196733 (Li et al.) discloses a system that divides a ranked group of online messages into a first list, a second list, and a promotion set. Each message in the first list has a performance score that is greater than each performance score of messages in the second list and the promotion set. The system moves a message within the promotion set to a third list as a function of a confidence value and moves a message from one of the third list and the second list to the first list based on an experiment event outcome. The system transmits top messages in the first list over a network for display at a recipient computer (abstract).

US2014/0280548 (Langlois et al.) discloses a method and system for exploring a list of user interests beyond the currently known user interests by defining a distance metrics in the interest space. The new method and system and system target for exploration, items of interest which are close in proximity to the current set of user interests thereby greatly improving the chance that one of the exploration items will be liked by the user.

WO2013189261 (Ioannidis et al.) discloses a method of selection that maximizes an expected reward in a contextual multi-armed bandit setting gathers rewards from randomly selected items in a database of items, where the items correspond to arms in a contextual multi-armed bandit setting. Initially, an item is selected at random and is transmitted to a user device which generates a reward. The items and resulting rewards are recorded. Subsequently, a context is generated by the user device which causes a learning and selection engine to calculate an estimate for each arm in the specific context, the estimate calculated using the recorded items and resulting rewards. Using the estimate, an item from the database is selected and transferred to the user device. The selected item is chosen to maximize a probability of a reward from the user device.

U.S. Pat. No. 7,707,131 (Chickering et al.) discloses a system and method for online reinforcement learning. In particular, a method for performing the explore-vs.-exploit tradeoff is provided. Although the method is heuristic, it can be applied in a principled manner while simultaneously learning the parameters and/or structure of the model (e.g., Bayesian network model).

US20110264639 (Slivkins et al.) discloses a document selector that selects and ranks documents that are relevant to a query. The document selector executes an instance of a multi-armed bandits algorithm to select a document for each slot of a results page according to one or more strategies. The documents are selected in an order defined by the results page and documents selected for previous slots are used to guide the selection of a document for a current slot. If a document in a slot is subsequently selected, the strategy used to select the document is rewarded with positive feedback. When the uncertainty in an estimate of the utility of a strategy is less than the variation between documents associated with the strategy, the strategy is subdivided into multiple strategies. The document selector is able to "zoom in" on effective strategies and provide more relevant search results.

US20120016642 (Li et al.) discloses methods and apparatus for performing computer-implemented personalized recommendations are disclosed. User information pertaining to a plurality of features of a plurality of users may be obtained. In addition, item information pertaining to a plurality of features of the plurality of items may be obtained. A plurality of sets of coefficients of a linear model may be obtained based at least in part on the user information and/or the item information such that each of the plurality of sets of coefficients corresponds to a different one of a plurality of items, where each of the plurality of sets of coefficients includes a plurality of coefficients, each of the plurality of coefficients corresponding to one of the plurality of features. In addition, at least one of the plurality of coefficients may be shared among the plurality of sets of coefficients for the plurality of items. Each of a plurality of scores for a user may be calculated using the linear model based at least in part upon a corresponding one of the plurality of sets of coefficients associated with a corresponding one of the plurality of items, where each of the plurality of scores indicates a level of interest in a corresponding one of a plurality of items. A plurality of confidence intervals may be ascertained, each of the plurality of confidence intervals indicating a range representing a level of confidence in a corresponding one of the plurality of scores associated with a corresponding one of the plurality of items. One of the plurality of items for which a sum of a corresponding one of the plurality of scores and a corresponding one of the plurality of confidence intervals is highest may be recommended.

U.S. Pat. No. 8,001,001 (Brady et al.) discloses an improved system and method is provided for using sampling for allocating web page placements in online publishing of content. A multi-armed bandit engine may be provided for sampling content items by allocating web page placements of varying quality for content items and optimizing the payoff to maximize revenue. Publishers may provide content items to be published and report their valuation per click. Through a process of valuation discovery, the click-through rate for content items and the value of content items may be learned through sampling. As the process of valuation discovery progresses, the present invention may more closely approximate the click-through rates for content items in order to allocate web page placements to content items that may optimize content layout by maximizing revenue. The present invention may accurately learn the CTR for new content items and support multiple web page placements of varying quality.

U.S. Pat. No. 8,923,621 (Slaney et al.) relates to a software for initialized explore-exploit creates a plurality of probability distributions. Each of these probability distributions is generated by inputting a quantitative description of one or more features associated with an image into a regression model that outputs a probability distribution for a measure of engagingness for the image. Each of the images is conceptually related to the other images. The software uses the plurality of probability distributions to initialize a multi-armed bandit model that outputs a serving scheme for each of the images. Then the software serves a plurality of the images on a web page displaying search results, based at least in part on the serving scheme.

US20090043597 (Agarwal et al.) relates to an improved system and method for matching objects using a cluster-dependent multi-armed bandit is provided. The matching may be performed by using a multi-armed bandit where the arms of the bandit may be dependent. In an embodiment, a set of objects segmented into a plurality of clusters of dependent objects may be received, and then a two step policy may be employed by a multi-armed bandit by first running over clusters of arms to select a cluster, and then secondly picking a particular arm inside the selected cluster. The multi-armed bandit may exploit dependencies among the arms to efficiently support exploration of a large number of arms. Various embodiments may include policies for discounted rewards and policies for undiscounted reward. These policies may consider each cluster in isolation during processing, and consequently may dramatically reduce the size of a large state space for finding a solution.

US20100250523 (Jin et al.) relates to an improved system and method for learning a ranking model that optimizes a ranking evaluation metric for ranking search results of a search query is provided. An optimized nDCG ranking model that optimizes an approximation of an average nDCG ranking evaluation metric may be generated from training data through an iterative boosting method for learning to more accurately rank a list of search results for a query. A combination of weak ranking classifiers may be iteratively learned that optimize an approximation of an average nDCG ranking evaluation metric for the training data by training a weak ranking classifier at each iteration for each document in the training data with a computed weight and assigned class label, and then updating the optimized nDCG ranking model by adding the weak ranking classifier with a combination weight to the optimized nDCG ranking model.

U.S. Pat. No. 8,473,486 (He et al.) relates to a supervised technique uses relevance judgments to train a dependency parser such that it approximately optimizes Normalized Discounted Cumulative Gain (NDCG) in information retrieval. A weighted tree edit distance between the parse tree for a query and the parse tree for a document is added to a ranking function, where the edit distance weights are parameters from the parser. Using parser parameters in the ranking function enables approximate optimization of the parser's parameters for NDCG by adding some constraints to the objective function.

SUMMARY

It is an object of the present technology to ameliorate at least some of the inconveniences present in the prior art.

The present disclosure is based upon developers' appreciation that the prior art scheme of user-system interaction may not be able to find the user-interaction based features required for adequate ranking for web resources lacking prior-history features, since these low ranked web resources are less likely to be placed on the SERPs and, therefore, have a lower potential for receiving user interaction based feedback. Therefore, it may be of use to have other mechanisms to place lower ranked web resources on the upper positions to attract more user feedback to them. In this way, the search engine provider may potentially degrade the query performance for a short period of time, by taking the risk of showing some less relevant web resources on the top positions, but improve it in the long term, by giving a chance to get user feedback (and, hence, improve their scores) for more potentially highly relevant web resources.

Developers developed embodiments of the present technology on an adopted "Bandit Algorithm". Generally speaking, in accordance with the bandit algorithm, there are two different ranking strategies: the exploitative one, aiming, at each step, to maximize the ranking performance for the current query issue, and the exploratory one, allowing collecting more user feedback on lower ranked web resources even at the cost of degrading the ranking performance for some query issues. It is especially important to achieve the optimal interplay between these two strategies that maximizes the cumulative quality of a series of consecutive query issues. This problem is referred to as the Online Learning to Rank with Exploration and Exploitation (OLREE) problem in this technology. It is a particular case of an exploration-exploitation trade-off problem formalized in the Stochastic Multi-Armed Bandit (SMAB) setting.

In accordance with one broad aspect of the present technology, there is provided a method for processing a search query, the method executable by a search engine server, search engine server coupled to a crawled web resource database and a communication network. The method includes receiving, by the search engine server, a search query from an electronic device associated with a user; selecting, by a ranking algorithm of the search engine server, at least one relevant web resource to the search query, the at least one relevant web resource having at least one prior-history feature that can be used by the ranking algorithm for ranking the at least one relevant web resource for inclusion into a search engine results page (SERP); acquiring from the crawled web resource database, a plurality of candidate web resources, each web resource of the plurality of candidate web resources not having a prior-history feature that can be used by the ranking algorithm; applying a first machine learned algorithm to determine, for each of the web resources of the plurality of candidate web resources, a predicted relevancy parameter, the predicted relevancy parameter being based, at least in part, on a respective web-resource-inherent data, the predicted relevancy parameter being indicative of a predicted relevancy of the respective web resource to the search query; applying a second machine learned algorithm to determine, for each of the plurality of candidate web resources, an exploration score based at least in part of the respective predicted relevancy parameter, and inputting the determined exploration score of the plurality of candidate web resources into a bandit-based-ranking algorithm for: (i) ranking the plurality of candidate web resources; (ii) selecting a subset of higher-ranked candidate web resources by applying a predefined inclusion parameter indicative of an acceptable number of candidate web resources of the plurality of candidate web resources to be included into the SERP; generating the SERP for rendering search results in a decreased relevancy order, the generating including adding to a higher-ranked position of the SERP: (i) the subset of higher ranked ones of the plurality of candidate web resources; (ii) the at least one relevant web resource to the search query; receiving user interaction data indicative of a user interaction with a displayed web resource on the SERP, the displayed web resource being one of the at least one of the subset of higher ranked ones of the plurality of candidate web resources and the at least one relevant web resource; and storing an indication of the user interaction data in association with the subset of higher ranked ones of the plurality of candidate web resources.

In some implementations of the method, the first machine learned algorithm comprises: a third machine learned algorithm and a fourth machine learned algorithm: the third machine learned algorithm to determine a probability of gain; the fourth machine learned algorithm a confidence parameter of the probability of gain, the probability of gain and the confidence parameter defining the predicted relevancy parameter.

In some implementations of the method, the third machine learned algorithm is a gradient boosted decision trees.

In some implementations of the method, the third machine learned algorithm is configured to analyze the web-resource-inherent data to extract web resource-specific features and to use the web resource-specific features of the candidate web resource as an input feature thereto.

In some implementations of the method, the fourth machine learned algorithm is configured to receive, at least, the results of predictions of the third machine learned algorithm as an input feature to predict an absolute error of the third machine learned algorithm.

In some implementations of the method, the probability of gain is transformed to a mean probability of gain.

In some implementations of the method, the transforming is done using an isotonic regression with breaking ties.

In some implementations of the method, the second machine learned algorithm is configured to receive as input features, at least: the mean probability of gain; and the confidence parameter of the probability of gain.

In some implementations of the method, a particular one of the set of candidate web resources not having a prior-history feature that can be used by the default ranking algorithm comprises a minimal-set of prior history features not sufficient for use by the ranking algorithm, the determining the predicted relevancy parameter for the particular one of the set of candidate web resources comprises determining a second probability of gain, the second probability of gain being based on at least one of (i) a number of prior displays of the particular one of the set of candidate web resources on a prior SERP, (ii) a number of clicks of the particular one of the set of candidate web resources on the prior SERP, and (iii) a posterior probability density parameter.

In some implementations of the method, the data indicative of the user interaction with a displayed web resource on the SERP comprises a location of the selected displayed web resource.

In some implementations of the method, the storing the indication of the user interaction data in association with the subset of higher ranked candidate web resources comprises storing the indication of the user interaction data with a given candidate web resource and wherein the storing further comprises analyzing the interaction data using a dependent click model (DCM) if the given candidate web resource is located at a ranked position on the SERP that is a same or higher position than the selected displayed web resource.

In some implementations of the method, the storing the indication of the user interaction data in association with the subset of higher ranked candidate web resources comprises storing the indication of the user interaction data with a given candidate web resource and wherein the storing further comprises analyzing the interaction data comprises using an expectation-maximization (EM) algorithm, or Bayesian inference, if the given candidate web resource is located at a ranked position on the SERP that is a lower position compared to the selected displayed web resource.

In accordance with another broad aspect, there is provided a search engine server coupled to a crawled web resource database and a communication network. The search engine server includes a communication interface configured to communicate with the search engine server the communication network; at least one computer processor operationally connected with the communication interface, configured to: receive, by the search engine server, a search query from an electronic device associated with a user; select, by a ranking algorithm of the search engine server, at least one relevant web resource to the search query, the at least one relevant web resource having at least one prior-history feature that can be used by the ranking algorithm for ranking the at least one relevant web resource for inclusion into a search engine results page (SERP); acquire from the crawled web resource database, a plurality of candidate web resources, each candidate web resource of the plurality of candidate web resources not having a prior-history feature that can be used by the ranking algorithm; apply a first machine learned algorithm to determine, for each of the candidate web resources of the plurality of candidate web resources, a predicted relevancy parameter, the predicted relevancy parameter being based, at least in part, on a respective web-resource-inherent data, the predicted relevancy parameter being indicative of a predicted relevancy of the respective candidate web resource to the search query; apply a second machine learned algorithm to determine, for each of the plurality of candidate web resources, an exploration score based at least in part of the respective predicted relevancy parameter, and inputting the determined exploration score of the plurality of candidate web resources into a bandit-based-ranking algorithm for: ranking the plurality of candidate web resources; selecting a subset of higher-ranked candidate web resources by applying a predefined inclusion parameter indicative of an acceptable number of candidate web resources of the plurality of candidate web resources to be included into the SERP; generate the SERP for rendering search results in a decreased relevancy order, the generating including adding to a higher-ranked position of the SERP: the subset of higher ranked candidate web resources; the at least one relevant web resource to the search query; receive user interaction data indicative of a user interaction with a displayed web resource on the SERP, the displayed web resource being one of the at least one of the subset of higher ranked candidate web resources and the at least one relevant web resource; and store an indication of the user interaction data in association with the subset of higher ranked candidate web resources.

In some implementations of the server, the first machine learned algorithm comprises: a third machine learned algorithm and a fourth machine learned algorithm: the third machine learned algorithm to determine a probability of gain; the fourth machine learned algorithm a confidence parameter of the probability of gain, wherein the probability of gain and the confidence parameter define the predicted relevancy parameter.

In some implementations of the server, the third machine learned algorithm is a gradient boosted decision trees.

In some implementations of the server, the third machine learned algorithm is configured to analyze the web-resource-inherent data to extract web resource-specific features and to use the web resource-specific features of the candidate web resource as an input feature thereto.

In some implementations of the server, the fourth machine learned algorithm is configured to receive, at least, the results of predictions of the third machine learned algorithm as an input feature to predict an absolute error of the third machine learned algorithm.

In some implementations of the server, the processor is further configured to transform the probability of gain to a mean probability of gain.

In some implementations of the server, the transforming is done using an isotonic regression with breaking ties.

In some implementations of the server, the second machine learned algorithm is configured to receive as input features, at least: the mean probability of gain; and the confidence parameter of the probability of gain.

In some implementations of the server, a particular one of the set of candidate web resources not having a prior-history feature that can be used by the default ranking algorithm comprises a minimal-set of prior history features not sufficient for use by the ranking algorithm, wherein the determining the predicted relevancy parameter for the particular one of the set of candidate web resources comprises determining a second probability of gain, the second probability of gain being based on at least one of (i) a number of prior displays of the particular one of the set of candidate web resources on a prior SERP, (ii) a number of clicks of the particular one of the set of candidate web resources on the prior SERP, and (iii) a posterior probability density parameter.

In some implementations of the server, the data indicative of the user interaction with a displayed web resource on the SERP comprises a location of the selected displayed web resource.

In some implementations of the server, the storing the indication of the user interaction data in association with the subset of higher ranked candidate web resources comprises storing the indication of the user interaction data with a given candidate web resource and wherein the storing further comprises analyzing the interaction data using a dependent click model (DCM) if the given candidate web resource is located at a ranked position on the SERP that is a same or higher position than the selected displayed web resource.

In some implementations of the server, storing the indication of the user interaction data in association with the subset of higher ranked candidate web resources comprises storing the indication of the user interaction data with a given candidate web resource and wherein the storing further comprises analyzing the interaction data comprises using an expectation-maximization (EM) algorithm, or Bayesian inference, if the given candidate web resource is located at a ranked position on the SERP that is a lower position compared to the selected displayed web resource.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where.

An appendix is provided at the end of the present specification. The Appendix includes a copy of the published article entitled "Gathering Additional Feedback on Search Results by Multi-Armed Bandits with Respect to Production Ranking" (marked as 34055-529 Appendix A) and a copy of the published article "Improving Search Quality with Bandit Approach" (marked as 34055-529 Appendix B). These articles provide additional background information, description of implementations of the present technology and examples. These articles are to form part of the application as files. The entireties of these articles are incorporated herein by reference in their entirety, in all those jurisdictions where such incorporation by reference is allowed.

DETAILED DESCRIPTION

Figure 1:
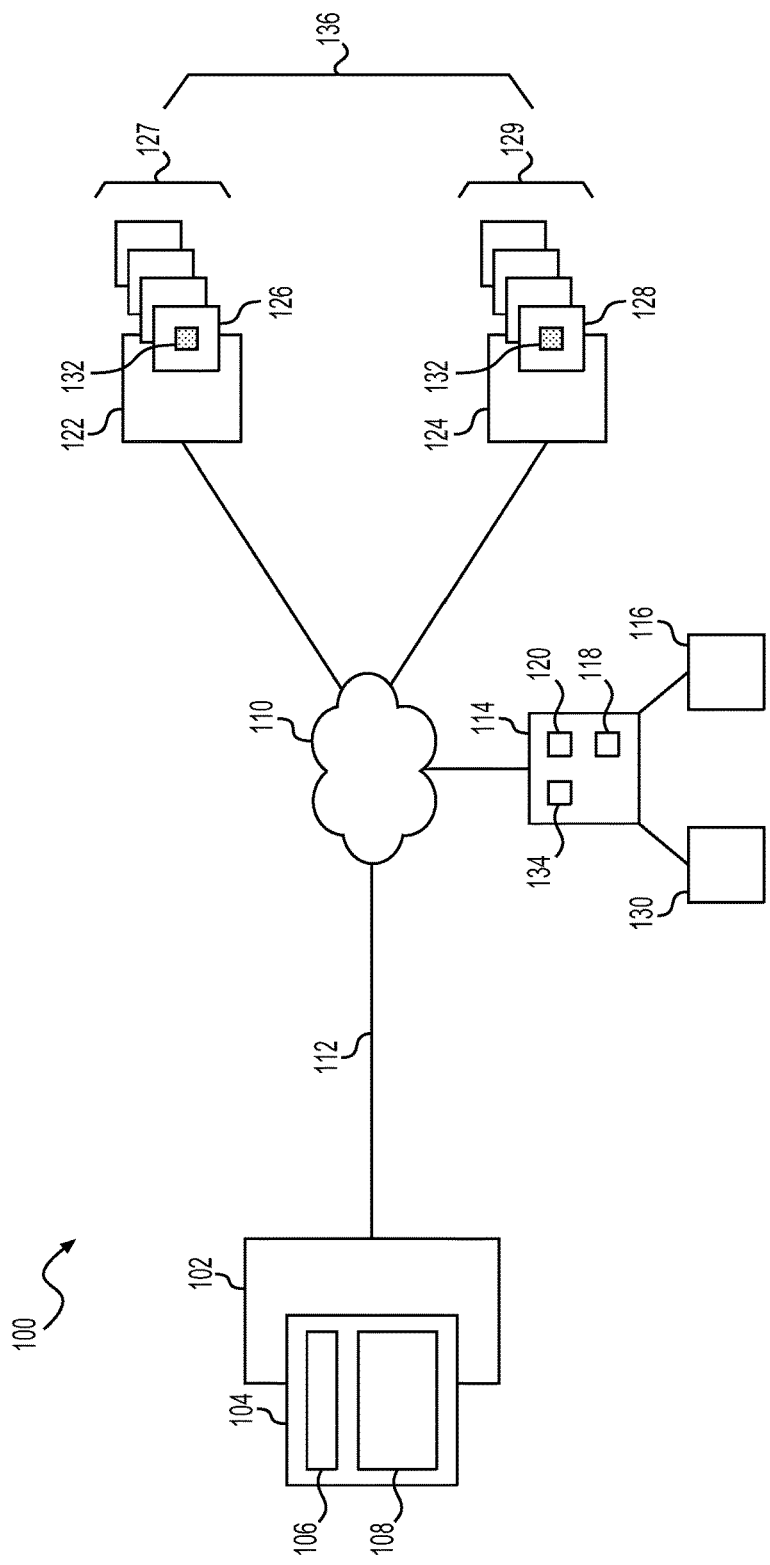
FIG. 1 is a schematic diagram of a system in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises hardware and/or software and/or firmware (or a combination thereof), as is known in the art, to execute a search application 104. Generally speaking, the purpose of the search application 104 is to enable the user to execute a search on the web. To that end, the search application 104 comprises a query interface 106 and a search results interface 108.

How the search application 104 is implemented is not particularly limited. One example of the search application 104 may be embodied in a user accessing a web site associated with a search engine to access the search application 104. For example, the search application can be accessed by typing in an URL associated with Yandex™ search engine at www.yandex.ru. It should expressly be understood that the search application 104 can be accessed using any other commercially available or proprietary search engine.

Generally speaking, the search application 104 is configured to receive from the user a query, for example a "search string" and to provide search results that are responsive to the query. Briefly speaking, the query is transferred to a search engine server 114 (described below) over a communication network 110 (described below), and the search engine server 114 will carry out the query, or causing the query to be carried out.

The electronic device 102 is coupled to the communication network 110 via a communication link 112. In some non-limiting embodiments of the present technology, the communication network 110 can be implemented as the Internet. In other embodiments of the present technology, the communication network 110 can be implemented differently, such as any wide-area communications network, local-area communications network, a private communications network and the like.

How the communication link 112 is implemented is not particularly limited and will depend on how the electronic device 102 is implemented. Merely as an example and not as a limitation, in those embodiments of the present technology where the electronic device 102 is implemented as a wireless communication device (such as a smart-phone), the communication link 112 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 102, the communication link 112 and the communication network 110 are provided for illustration purposes only. As such, those skilled in the art will easily appreciate other specific implementational details for the electronic device 102. As such, by no means, examples provided herein above are meant to limit the scope of the present technology.

Coupled to the communication network 110 is a search engine server 114. The search engine server 114 can be implemented as a conventional computer server. In an example of an embodiment of the present technology, the search engine server 114 can be implemented as a Dell™ PowerEdge™ Server running the Microsoft™ Windows Server™ operating system. Needless to say, the search engine server 114 can be implemented in any other suitable hardware and/or software and/or firmware or a combination thereof. In the depicted non-limiting embodiment of present technology, the search engine server 114 is a single server. In alternative non-limiting embodiments of the present technology, the functionality of the search engine server 114 may be distributed and may be implemented via multiple servers.

Generally speaking, the search engine server 114 is under control and/or management of a search engine provider (not depicted), such as, for example, an operator of the Yandex™ search engine. As such, the search engine server 114 may be configured to execute one or more searches responsive to the "search string" entered by the user into the query interface 106. The search engine server 114 is also configured to transmit to the electronic device 102 a set of search results, to be displayed to the user via the search results interface 108.

The search engine server 114 is also configured to execute a crawling function and, to that end, comprises a crawling application 120. Generally speaking the crawler application 120 is configured to access web resource servers (described below) to identify and retrieve web resources 136 hosted therein. Suffice it to say for now that, an indication of the crawled web resources are indexed and stored in a crawled web resource database 116. Although depicted as separate from the search engine server 114 to which it is coupled to via a dedicated link (not numbered), the crawled web resource database 116 may be implemented as part of the search engine server 114. Generally speaking, the crawled web resource database 116 also contains records for each crawled object, where the record can include data such as the date of the last access or crawling, which may be used by the crawling application 120 to keep the crawled web resource database 116 up-to-date, and which can further reduce or eliminate duplicates.

The search engine server 114 is also coupled to search logs 130 via a link (not numbered). Broadly speaking, the search logs 130 is configured to store prior-history features with a given web resource associated with a multiple users' network interaction via the search application 104. For the purpose of this present technology, "prior-history features" refers to the "search string", which one or more users input to the search application 104, as well as search action data (such as for example, but not limited to, click through data, position of the clicked web resource) of the users that are stored in the search logs 130. Although the search logs 130 is depicted as separate entities from the search engine server 114, it is possible to implement the search logs 130 as part of the search engine server 114.

In order to execute the search using the search application 104, the search engine server 114 is configured to execute web searches. Functionality of the search engine server 114 is generally known, but briefly speaking, the search engine server 114 is configured to execute: (i) receiving a search query from the electronic device 102 via the search application 104; (ii) process the search query (normalize the search query, etc.); (iii) execute search for web resources that are responsive to the search query by accessing the crawled web resource database 116, the crawled web resource database 116 containing an index of crawled web resources (described below) and (iv) return a list of search results (not numbered) to the electronic device 102 for the search application 104 for output to the search engine result page (SERP) containing link to web resources that are responsive to the search query.

The manner in which the returned list of search results is implemented is not limited. Generally speaking, the search results included in the list are ordered in a relevancy-based ranking manner. As such, in some embodiments of the present technology, the search engine server 114 comprises a ranking algorithm 118 for analyzing a plurality of criteria to determine which crawled web resources is more relevant than the other. For example, and not as a limitation, the ranking algorithm 118 ranks the crawled web resources based both on the prior-history feature stored in the search logs 130 and the web-resource-inherent data 132 (described below).

In other words, the list of search results displayed on the SERP is displayed in a relevancy based order. Naturally the web resources determined to be highly relevant by the ranking algorithm 118 would be placed in a relatively high position of the SERP, such as for example, the first position of the first page of the SERP. Alternatively, the web resources that are determined to be less relevant by the ranking algorithm 118 would be placed in a relatively low position of the SERP, such as for example, the last page of the SERP.

For the purposes of illustration, provided within the system 100 is a first web resource server 122, and a second web resource server 124. In some embodiments, the first web resource server 122 and the second web resource server 124 are connected to the communication network 110 via a dedicated link (not numbered). Each of the first web resource server 122 and the second web resource server 124 can be implemented in a similar manner to the search engine server 114.

Needless to say, each of the first web resource server 122 and the second web resource server 124 can be implemented in any other suitable hardware and/or software and/or firmware or a combination thereof. Additionally, a given one of the first web resource server 122 and the second web resource server 124 can be implemented differently from one another.

Also, in the depicted non-limiting embodiment of the present technology, each of the first web resource server 122 and the second web resource server 124 is a single server. In alternative non-limiting embodiments of the present technology, the functionality of each of the first web resource server 122 and the second web resource server 124 may be distributed and may be implemented via multiple servers.

Each of the first web resource server 122 and the second web resource server 124 is configured to host web resources 136 being accessible by the electronic device 102 via the communication network. Generally speaking, the respective web resources 136 can be accessed by the electronic device 102 by means of inputting the URL in the browsing application (not depicted) of the electronic device 102, or executing a web search using the search engine server 114.

In the depicted embodiment, the first web resource server 122 hosts a set of old web resources 127, the set of old web resources 127 comprising at least one old web resource 126. The second web resource server 124 hosts a set of candidate web resources 129, the set of candidate web resources 129 comprising at least one candidate web resource 128. It should be expressly understood that the depicted embodiment is merely an example, and is no way intended to imply that the first web resource server 122 is dedicated only to hosting the set of old web resources 127, and alternatively, that the second web resource server 124 is dedicated only to hosting the set of candidate web resources 129. Naturally, the first web resource server 122 may host both the set of old web resources 127 and the set of candidate web resources 129, or only the set of candidate web resources 129, and vice versa for the second web resource server 124.

For the purposes of the present technology, "old web resource" shall denote a web resource that has been previously crawled by the crawling application 120 and which contains enough prior-history features in the search logs 130, thus allowing it to be displayed regularly on a high position of the SERP in response to a particular query by the ranking algorithm 118. In other words, the old web resource 126 has previously been crawled, and has been displayed at least once (but more likely multiple times) on the SERP as a result of executing a particular "search string", for which prior-history features, such as data indicative of user interaction is stored in the search logs 130. On the flip side, the "candidate web resource" shall denote a web resource that has been recently crawled by the crawling application 120, but does not contain any (or sufficient number of) prior-history features in the search logs 130 to be displayed at a high position of the SERP in response to a particular query by the ranking algorithm 118. In other words, the candidate web resource 128 has been crawled, but has never been displayed on the SERP as a result of executing a particular "search string", and therefore does not contain any data indicative of user interaction stored in the search logs 130. Alternatively, the candidate web resource 128 has been crawled, but has only been shown on the SERP for a relatively small number of times, the number of displays not being sufficient to provide indication of user interaction sufficient for the ranking algorithm 118 to adequately rank the candidate web resource 128 at a high position on the SERP.

As briefly mentioned above, each of the web resources 136 that are hosted on the first web resource server 122 and second web resource server 124 comprises a unique web-resource-inherent data 132. The web-resource-inherent data 132 refers to the web-resource-specific features of the given web resource. For example, and not as a limitation, the web-resource-specific features may include metadata, numbers and associations of hyperlinks, embeds, texts, and the like.

In some embodiments of the present technology, in addition to the ranking algorithm 118, the search engine server 114 also comprises an exploration ranking module 134. In some embodiments of the present technology, the exploration ranking module 134 is configured to select a predefined number of potentially relevant candidate web resources 128 for inclusion at a high position of the SERP in response to a particular query from the electronic device 102.

The ranking module 134 is configured to execute: (i) pre-selection of a predetermined number of candidate web resources from the set of candidate web resources 129 for inclusion at the high position in the SERP with respect to a particular query; and (ii) gathering data indicative of user interaction with the displayed candidate web resources for storing in the search logs 130 as prior-history features for a subsequent search query. Generally speaking, when selecting the candidate web resources from the set of candidate web resources 129, the exploration ranking module 134 is configured to maximize the number of candidate web resources that the exploration ranking module 134 "forces" to be included in the SERP to gather user interaction information, while minimizing the potential impact on user satisfaction when interacting with the SERP in case it turns out that one or more of the candidate web resources 128 do not meet the required level of relevancy to the search query.

Figure 2:
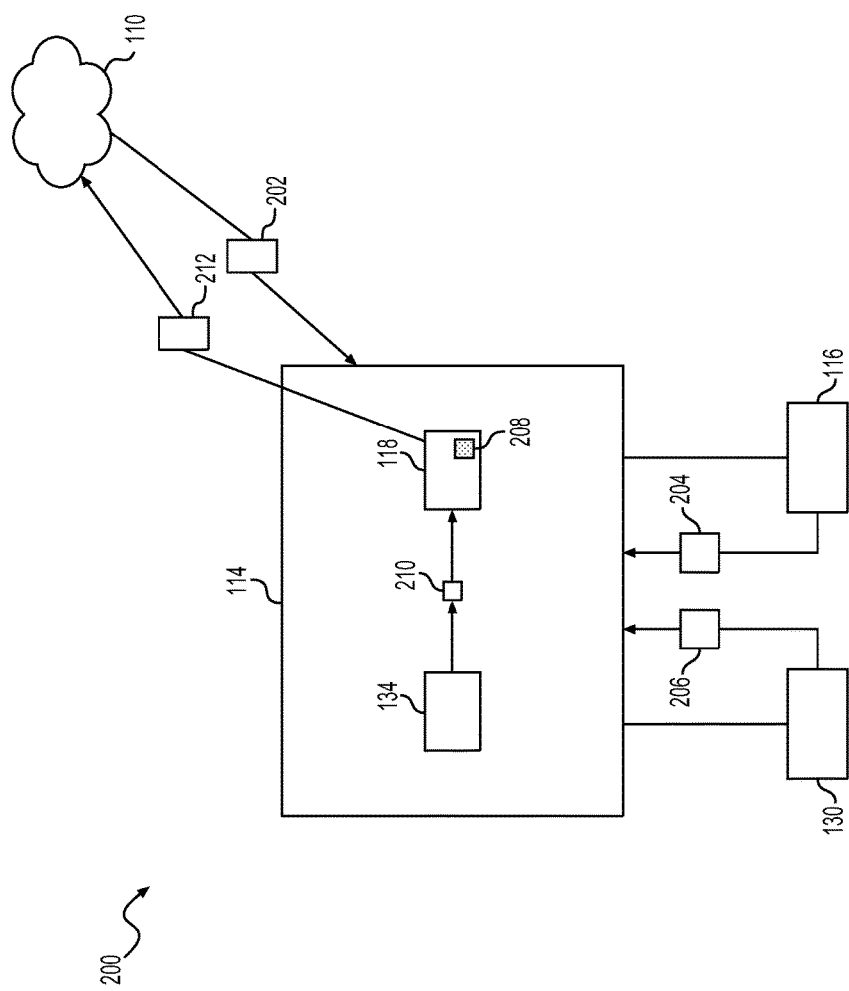
FIG. 2 is a block diagram demonstrating an architecture of a search engine server according to some non-limiting implementations of the present technology.

FIG. 2 is a block diagram specifically demonstrating an architecture 200 illustrating the ranking of the web resources 136 which contains the ranking algorithm 118 and the exploration ranking module 134, the crawled web resource data base 116 and the search logs 130 according to some implementations.

As stated previously, the search engine server 114 may be configured to execute one or more searches responsive to the "search string" entered by the user into the query interface 106. For example in FIG. 2, the search engine server 114 receives, via the communication network 110 a data packet 202 comprising of the search query.

In response to receiving the data packet 202, the search engine server 114 processes the data packet 202 and retrieves, from the crawled web resource data base 116, a data packet 204 which comprises of a list of the plurality of web resources 136 deemed relevant to the search query. In some non-limiting embodiments, the data packet 204 comprises data indicative of the set of old web resources 127, and the set of candidate web resources 129.

Upon receiving the data packet 204, the search engine server 114 triggers the ranking algorithm 118 to rank the list of web resources 136. The manner in which the ranking is done has been previously mentioned, and as such suffice it to say that the ranking algorithm 118 ranks the web resources based at least on the prior-history features of the web resources 136. As such, in some embodiments of the present technology the ranking algorithm 118 receives from the search logs 130 a data packet 206 comprising of data indicative of prior-history features for each of the old web resource 126 and candidate web resource 128. In the depicted embodiment, the ranking algorithm 118 has selected a subset of high ranked web resource 208, comprising of at least one (if not all) old web resource 126.

Also comprised in the search engine server 114 is the exploration ranking module 134. In some embodiments of the present technology the exploration ranking module 134 is configured to identify the set of candidate web resources 129 by analyzing the data packet 204 and data packet 206. More precisely, the exploration ranking module 134 is configured to acquire the set of candidate web resource 129 for which there is no (or sufficient number) prior-history features, consequently resulting in being ranked at a lower position by the ranking algorithm 118. Once acquired, the exploration ranking module 134 applies a set of rules to rank the set of candidate web resources 129 for inclusion at a high position in the SERP.

Figure 3:
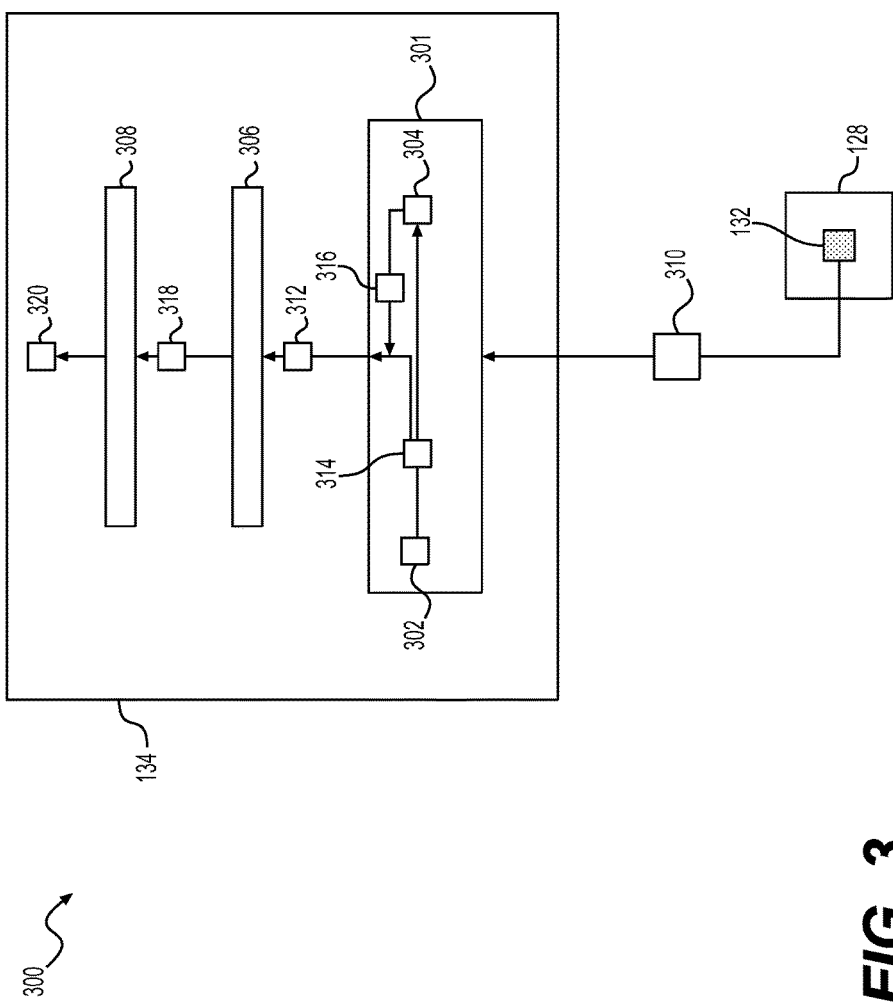
FIG. 3 is a block diagram demonstrating an architecture of an exploration ranking module of the search engine service of FIG. 1, the exploration ranking module being implemented according to some non-limiting implementation of the present technology.

For describing the set of rules, there is provided a FIG. 3 depicting a block diagram demonstrating the architecture 300 illustrating an example of the set of rules applied by the exploration ranking module 134. According to some embodiments of the present technology, the set of candidate web resources 129 are ranked based on an exploration score 318.

Determining the Exploration Score

In some embodiments of the present technology, for each search query received via the data packet 202, the exploration ranking module 134 stores information about each candidate web resources 128 which includes (i) a probability of gain 314 and (ii) a confidence 316 in the probability of gain 314. For the purpose of this technology, the terms "probability of gain" refers to the probability that the given candidate web resource 128 satisfies the search query (received via the data packet 202). In some embodiments of the present technology, the exploration ranking module 134 calculates the exploration score 318 in the following manner:

$$S_t(d) := S_{B,t}(F_t(d)) \quad \text{(Equation 1)}$$

Where $S_t(d)$ is the exploration score 318 for the given candidate web resource 128, $F_t(d)$ is a predicted relevancy parameter 312, and $S_{B,t}$ is either a random or deterministic scoring function depending on a particular bandit approach (described below). For the purpose of this technology, the term "predicted relevancy parameter" refers to the predicted relevancy of the given candidate web resource 128 to the search query (received via the data packet 202) and is based in part of the probability of gain 314 and confidence 316. The manner in which the exploration score 318 is determined is not limited, and in some embodiments of present technology, there are provided two types of bandit algorithm.

Firstly, following the UCB-1 approach, the exploration score 318 for each candidate web resource 128 for a particular step is calculated as follow:

$$S_t(d) = \hat{r}_{d,t} + \alpha \sqrt{\frac{2 \ln t}{\gamma_{d,t}}} \quad \text{(Equation 2)}$$

Where the pointwise estimate of the probability of gain 314 $\hat{r}_{d,t}$ is equal to $(W_{d,t})/(\gamma_{d,t})$ is the maximum likelihood estimate of the probability of gain $r_d$ after query issue (t−1), $\gamma_{d,t}$ is the number of trials of the web resource d during the first (t−1) query issue, $W_{d,t}$ is the number of successful trials among them, α is a parameter controlling the exploration rate, which is defined at each query issue t.

Thus the predicted relevancy parameter 312 ($F_t(d)$) consists of two components, $\gamma_{d,t}$ and $W_{d,t}$.

On the other hand, the Bayesian bandit approach relies on the posterior probability density function $p_{d,t}(r)$, $r \in [0,1]$, of the probability of gain 314, where the predicted relevancy parameter 312 coincides with $(\{p_{d,t}(r)\}_{r \in [0,1]}$.

Alternatively, in some embodiments of the present technology, the UCB-1 approach is modified where the pointwise probability of gain 314 by the following modified rule: $\hat{r}_{d,t} = (W_{d,t}+1)/(\gamma_{d,t}+2)$.

In a further embodiment, the Bayesian bandit approach is modified where the exploration score 318 is calculated as follow:

$$S_t(d) = \bar{r}_d + \alpha \sigma_{d,t} \quad \text{(Equation 3)}$$

Naturally, given a candidate web resource 128 which does not contain any prior-history features, the exploration ranking module 134 must first predict the probability of gain 314 and the confidence 316 to obtain the "initial" predicted relevancy parameter 312. However it should be understood and as will be described in greater detail herein below, embodiments of the present technology are not limited to those candidate web resources 128 that do not have any prior-history features. It should be understood that embodiments of the present technology can be applied to a given one candidate web resource 128 that has a limited amount of prior-history features which are not sufficient for use by the ranking algorithm 118 for adequate ranking thereof.

Determining the Relevancy Parameter

In some embodiments of the present technology, the exploration ranking module comprises of a first machine learned algorithm 301 which comprises a mean-value-prediction machine learned algorithm (MVPML) 302, and a mean-absolute-deviation-prediction machine learned algorithm (MADPML) 304. Moreover the exploration ranking module 134 also comprises a second machine learned algorithm, namely a bandit algorithm 306, and a bandit based ranking algorithm (BBRA) 308.

In some embodiments of the present technology, whereas a given candidate web resource 128 does not have any prior-history features, the first machine learned algorithm 301 receives a data packet 310, which comprises of the web-resource-inherent data 132 for the given candidate web resource 128. In some embodiments, the first machine learned algorithm 301 is configured to determine the predicted relevancy parameter 312 for the given candidate web resource 128 based on the received data packet 310.

The manner in which the predicted relevancy parameter 312 is determined is not limited. In some embodiments of the present technology, the predicted relevancy parameter 312 is determined using the MVPML 302 and MADPML 304.

In some embodiments, the predicted relevancy parameter 312 comprises of two variables, namely the probability of gain 314 of the candidate web resource 128, and the confidence 316 of the probability of gain 314. The manner in which the probability of gain 314 is determined is not limited, and may be determined using the MVPML 302. By the same token, the manner in which the confidence 316 is determined is not limited, and may be determined using the MADPML 304.

In some embodiments, the MVPML 302 is a gradient boosted decision trees based algorithm that is configured to analyze the data packet 310 to predict the probability of gain 314. In some embodiments, the MVPML 302 is trained using vectors of a plurality of ranking features of the ranking algorithm 118. The number of the plurality of ranking features is not particularly limited and can range from at least two to several hundred or even several thousand ranking features. Thus, the probability of gain 314 is determined by extracting the web-resource-inherent data 132 which comprises web-resource-specific features and using the web-resource-specific features as an input feature.

In a further embodiment, the predictions of the MADPML 304 is used to train the MVMPL 302. More precisely, the confidence 316 is determined by the MADPML 304, which calculates the absolute error of the prediction results of the MVMPL 302. In some embodiments of the present technology, the probability of gain 314 (determined using the MVPML 302) is corrected to a mean probability of gain (not depicted). In some embodiments, the mean probability of gain produces the same ranking as if the candidate web resource 128 was ranked by the ranking algorithm 118. In some embodiments, the mean probability of gain is determined using an isotonic regression with breaking ties. Thus, based on the probability of gain 314 (or the mean probability of gain) and confidence 316, the first machine learned algorithm predicts the predicted relevancy parameter 312.

Determining the Exploration Score

Using the predicted relevancy parameter 312 obtained, the bandit algorithm 306 is configured to calculate an exploration score 318 (see Equation 1).

Once the exploration score 318 for the set of candidate web resources 129 is obtained. The BBRA 308 is configured to rank the set of the candidate web resources 129. In some embodiments of the present technology, the BBRA 308 may be formulated in the following algorithm 1:

---
Algorithm 1: Bandit-Based Ranking Algorithm (BBRA)
---

Data: set of documents D, number of query issues T, prior $F_0(d)$ for each $d \in D$;
1  for t = 0 to T − 1 do
2  | foreach $d \in D$ do
3  | | $S_t(d) = S_{n,t}(F_t(d))$;
4  | end
5  | Sort D by decreasing $S_t$: $\{d_1(t), d_2(t),...\}$;
6  | Display documents $\{d_1(t),...,d_k(t)\}$ to the user;
7  | Observe user behavior C on the SERP;
8  | for i = 1 to k do
9  | | $F_{t+1}(d_i(t)) = U(F_t(d_i(t)), C)$;
10 | end
11 end
Result: Ranking for each query issue: $\{d_t(t)\}_{t=1..k}^{t=1..T}$

---

Thus, in some embodiments of the present technology, based on the exploration score 318, each of the candidate web resource 128 is ranked.

In a further embodiment, the BBRA 308 is further configured to apply a predefined inclusion parameter to select a subset of higher ranked candidate web resources 320. For example, the BBRA 308 may select, but not limited to, only the top 10 higher ranked candidate web resources 320.

Returning now to FIG. 2, the exploration ranking module 134 is configured to transmit to the ranking algorithm 118 a data packet 210. The data packet 210 comprises data indicative of the subset of higher ranked candidate web resources 320.

In response to receiving the data packet 210, the ranking algorithm 118 transmits, to the electronic device 102, a data packet 212. The data packet 212 comprises data indicative of a list of search results, comprising of both the subset of higher ranked candidate web resources 320 and the subset of high ranked web resources 208. In some embodiments, the data packet 210 also comprises ranking information of the search results for display on the electronic device 102. For example, the data packet may contain instructions for the search results interface 108 to place the subset of higher ranked candidate web resources 320 at a higher position than the subset of high ranked web resources 208 on the SERP, in a decreasing order. Alternatively, the data packet may indicate to place the higher ranked candidate web resources 320 together with the subset of high ranked web resources 208 on the high position of the SERP.

Figure 4:
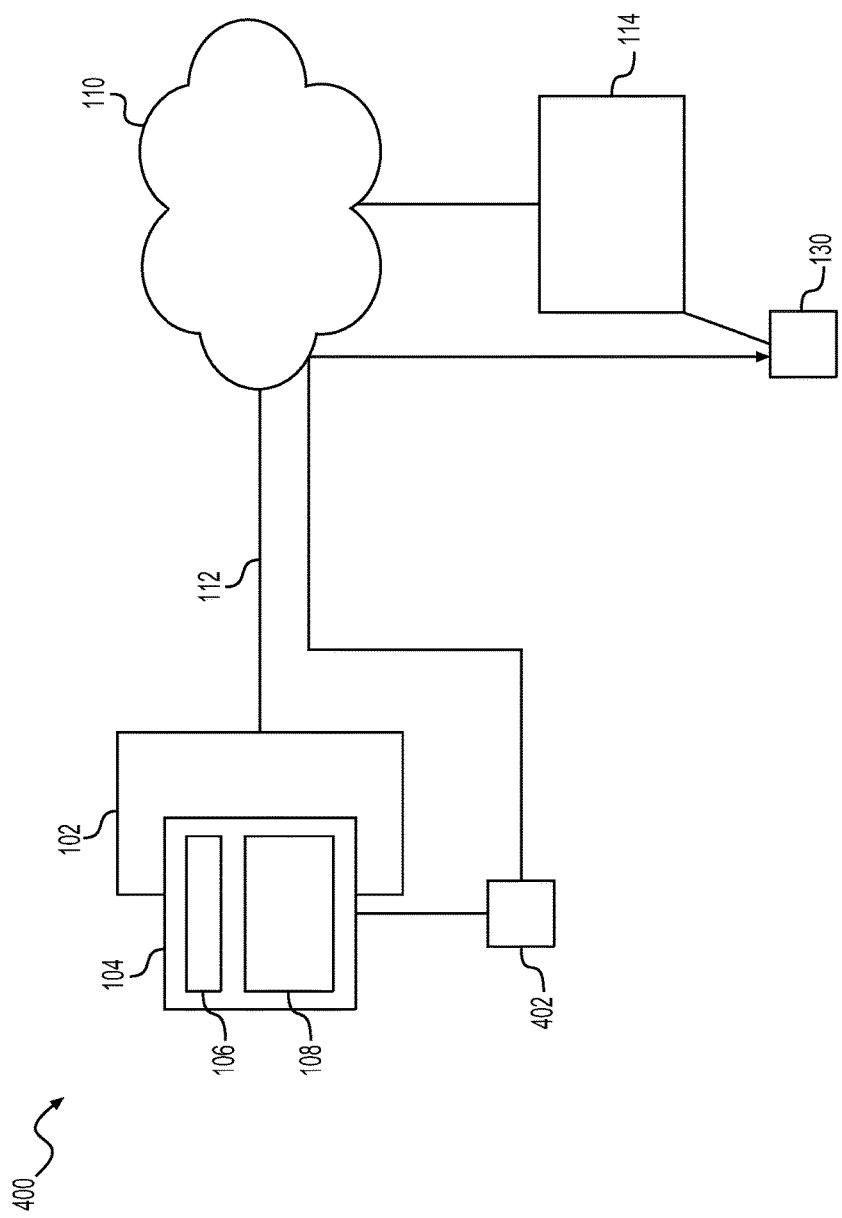
FIG. 4 is a schematic diagram demonstrating an example of search logs according to some non-limiting implementation of the present technology, the search logs being accessible by or forming part of the search engine server of FIG. 2.

FIG. 4 is a schematic diagram specifically demonstrating an architecture 400 illustrating an example of the search logs 130 according to an embodiment of the present technology.

Provided that the electronic device 102 has displayed the ranked search results list obtained by the data packet 212 and that the user has interacted with the SERP, a data packet 402 is transmitted from the electronic device to the search engine server 114 via the communication network 110.

In some embodiments, the data packet 402 comprises data indicative of the user interaction with a displayed web resource on the SERP, the displayed web resource being one of the at least one of the subset of higher ranked candidate web resources 320 and the subset of high ranked web resources 208. In some embodiments, the data indicative of the user interaction with the displayed web resource on the SERP comprises a location of the selected displayed web resource by the user.

Updating the Relevancy Parameter

In some embodiments of the present technology, the predicted relevancy parameter 312 (i.e. $F_t(d)$) of a given displayed candidate web resource 128 is updated. More precisely, any bandit approaches with the predicted relevancy parameter 312 that can be calculated on the basis of $\{W_{d,t}, \gamma_{d,t}, \{p_{d,t}(r)\}_{r \in [0,1]}\}$ may be updated on a Dependent Click Model (DCM). Generally speaking, the DCM is based on the cascade hypothesis and examination hypothesis. Given a ranking in response to a query issue t, the web resource position i is denoted by $d_i(t)$ and introduce two binary variables $E_d^t$ and $C_d^t$ that indicate the examination of the web resource snippet ($E_d^t$) and a click on the web resource ($C_d^t$). Thus, the candidate web resource 128 that is displayed on the SERP that is situated above or on the lowest click position is considered examined (and clicked, if situated on the lowest click position).

In some embodiments, the estimation of $E_d^t$ for the candidate web resource 128 that is placed below the lowest click position may be ignored in updating the predicted relevancy parameter 312. Alternatively, in some embodiments, it may be determined by estimating the posterior probability that it was examined. For example, under the UCB-1 and modified UCB-1 approach, the estimation $E_d^t$ is calculated using the expectation-maximization algorithm. Alternatively, under the Bayesian bandit and modified Bayesian bandit approach, the estimation of $E_d^t$ is calculated, for example, based on a Bayesian inference.

Despite obtaining first prior-history features, in most situation, it is yet still not enough for the ranking algorithm 118 to rank the candidate web resource 128 at a high position in the SERP for subsequent search query. Thus, in some embodiments of the present technology, the exploration ranking module 134 may determine a subsequent predicted relevancy parameter (not depicted) for the candidate web resource 128 having limited prior-history features in response to a subsequent search query. In some embodiments the subsequent predicted relevancy parameter comprises of a second probability of gain (not depicted) determined by the first machine learned algorithm 301, the second probability of gain being based on at least one of (i) a number of prior displays of the candidate web resource 128 on prior SERPs (i.e. $\gamma_{d,t}$), (ii) a number of clicks of the candidate web resource 128 on the prior SERPs (i.e. $W_{d,t}$) and, (iii) a posterior probability density parameter of the candidate web resource (i.e. $p_{d,t}(r)$, $r \in [0,1]$). In a further embodiment, based on the subsequent predicted relevancy parameter, the bandit algorithm 306 determines a subsequent exploration score (not depicted). The subsequent exploration score is then ranked by the BBRA 308.

Figure 5:
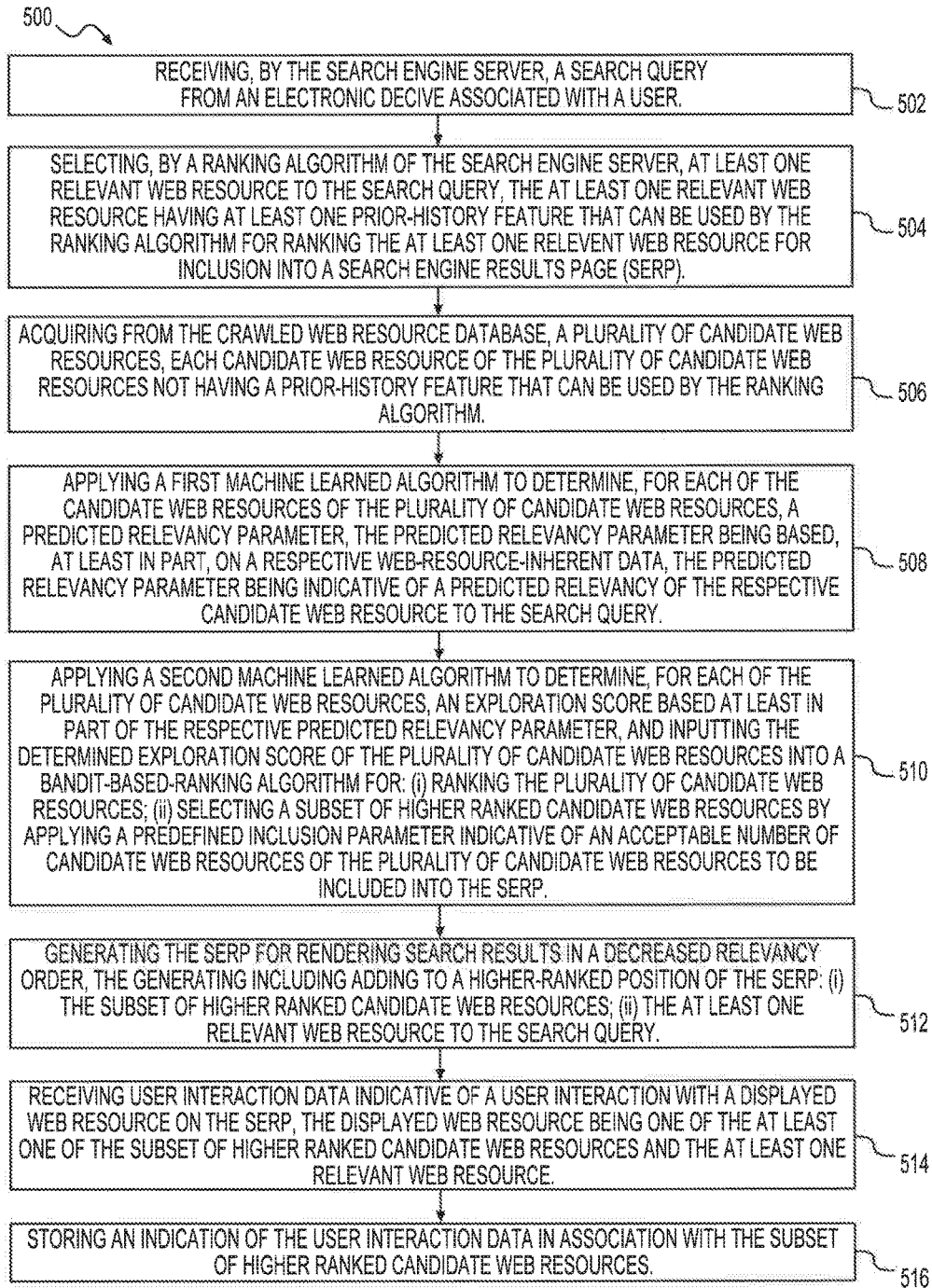
FIG. 5 is a flow diagram of an exemplary method for processing a search query.

With reference to FIG. 5, there is depicted a flow chart of a method 500, the method being executed at a search engine server 114 in accordance with non-limiting embodiments of the present technology.

Step 502: Receiving, by the search engine server, a search query from an electronic device associated with a user.

At step 502, the search engine server 114 receives a search query (via data packet 202) from the electronic device 102 associated with the user.

Step 504: Selecting, by a ranking algorithm of the search engine server, at least one relevant web resource to the search query, the at least one relevant web resource having at least one prior-history feature that can be used by the ranking algorithm for ranking the at least one relevant web resource for inclusion into a search engine results page (SERP).

At step 504, the ranking algorithm 118 of the search engine server 114 selects a subset of relevant high ranked web resources 208 for inclusion into the SERP. The selection being made at least in part of the prior-history features contained in the search logs 130.

Step 506: Acquiring from the crawled web resource database, a plurality of candidate web resources, each candidate web resource of the plurality of candidate web resources not having a prior-history feature that can be used by the ranking algorithm.

At step 506, the search engine server 114 acquires from the crawled web resource database 116, a set of candidate web resources 129. As stated above, the search logs 130 does not contain any, or enough prior-history feature of the candidate web resources 128 to be displayed at the high position of the SERP by the ranking algorithm 118.

Step 508: Applying a first machine learned algorithm to determine, for each of the candidate web resources of the plurality of candidate web resources, a predicted relevancy parameter, the predicted relevancy parameter being based, at least in part, on a respective web-resource-inherent data, the predicted relevancy parameter being indicative of a predicted relevancy of the respective candidate web resource to the search query.

At step 508, the search engine server 114 applies the first machine learned algorithm 301 to each of the subset of candidate web resources 129 to obtain the respective predicted relevancy parameter 312. The predicted relevancy parameter 312 is determined, at least based on the web-resource-inherent data 132.

In some embodiments of the present technology, the predicted relevancy parameter comprises of two variables, namely the probability of gain 314 and confidence 316 determined by the MVPML 302 and MADPML 304, respectively.

Step 510: Applying a second machine learned algorithm to determine, for each of the plurality of candidate web resources, an exploration score based at least in part of the respective predicted relevancy parameter, and further inputting the determined exploration score of the plurality of candidate web resources into a bandit-based-ranking algorithm for: (i) ranking the plurality of candidate web resources: (ii) selecting a subset of higher-ranked candidate web resources by applying a predefined inclusion parameter indicative of an acceptable number of candidate web resources of the plurality of candidate web resources to be included into the SERP.

At step 510, based on the predicted relevancy parameter 312, the bandit algorithm 306 determines the exploration score 318 for the respective subset of the candidate web resources 129. The exploration score 318 is then inputted into the BBRA 308 for ranking. In some embodiments of the present technology, the BBRA 308 applies a predefined inclusion parameter indicative of an acceptable number of candidate web resources to be included into the SERP.

Step 512: Generating the SERP for rendering search results in a decreased relevancy order, the generating including adding to a higher-ranked position of the SERP: (i) the subset of higher ranked candidate web resources; (ii) the at least one relevant web resource to the search query.

At step 512, the search engine server 114 generates the SERP in response to the search query received via data packet 202 for display on search results interface 108.

The generated SERP contains, at the high position, the subset of higher-ranked candidate web resources 320 determined by the exploration ranking module 134 and the high ranked web resources 208 determined by the ranking algorithm 118.

Step 514: Receiving user interaction data indicative of a user interaction with a displayed web resource on the SERP, the displayed web resource being one of the at least one of the subset of higher ranked candidate web resources and the at least one relevant web resource.

At step 514, the search engine server 114 receives a data packet 402 which comprises of user interaction data indicative of a user interaction with one of the displayed web resource on the SERP, the displayed web resource comprising at least one of the subset of higher ranked candidate web resources 320 and the high ranked web resources 208.

Step 516: Storing an indication of the user interaction data in association with the subset of higher ranked candidate web resources.

At step 516, the indication of the user interaction data associated with any given web resources comprising the subset of higher ranked candidate web resources 320 is stored in the search logs 130.

In some embodiments, the indication of the user interaction data in association with the subset of higher ranked candidate web resources are used by the ranking algorithm 118 for subsequent search queries as prior-history features of the set of candidate web resource 129.

In some embodiments of the present technology, the data indicative of the user interaction with a displayed web resource on the SERP comprises a location of the selected displayed web resource.

In a further embodiment, the storing further comprises analyzing the user interaction data using a dependent click model (DCM) if the given candidate web resource is located at a ranked position on the SERP that is a same or higher position than the selected displayed web resource.

Alternatively, if the given candidate web resource is located at a ranked position on the SERP that is a lower position compared to the selected displayed web resource, the storing further comprises analyzing the user interaction data using an expectation-maximization algorithm or Bayesian inference.

As a result, in response to a search query, the search engine server 114 can combine a subset of higher-ranked candidate web resources 320 and at least one relevant web resource 208 at a high position of the SERP. In this way, the search engine provider may potentially degrade the query performance for a short period of time, by taking the risk of showing some less relevant web resources on the top positions, but improve it in the long term, by giving a chance to get user feedback (and, hence, improve their scores) for more potentially highly relevant web resources.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

As such, from one perspective, embodiments of the present technology described above can be summarized as follows, structured in numbered clauses.

CLAUSE 1. A method (500) of processing a search query, the method executable by a search engine server (114), the search engine server (114) coupled to a crawled web resource database (116) and a communication network (110), the method (500) comprising:
  a. Receiving (502), by the search engine server (114), a search query from an electronic device (102) associated with a user,
  b. Selecting (504), by a ranking algorithm (118) of the search engine server (114), at least one relevant web resource (208) to the search query, the at least one relevant web resource (208) having at least one prior-history feature that can be used by the ranking algorithm (118) for ranking the at least one relevant web resource (208) for inclusion into a search engine results page (SERP);

c. acquiring (506) from the crawled web resource database (116), a plurality of candidate web resources (129), each candidate web resource (128) of the plurality of candidate web resources (129) not having a prior-history feature that can be used by the ranking algorithm (118);

d. applying (508) a first machine learned algorithm (301) to determine, for each of the candidate web resources (128) of the plurality of candidate web resources (129), a predicted relevancy parameter (312), the predicted relevancy parameter (312) being based, at least in part, on a respective web-resource-inherent data (132), the predicted relevancy parameter (312) being indicative of a predicted relevancy of the respective candidate web resource to the search query;

e. applying (510) a second machine learned algorithm (306) to determine, for each of the plurality of candidate web resources (128), an exploration score (318) based at least in part of the respective predicted relevancy parameter (312), and inputting the determined exploration score (318) of the plurality of candidate web resources (129) into a bandit-based-ranking algorithm (308) for:
   i. ranking the plurality of candidate web resources (129);
   ii. selecting a subset of higher-ranked candidate web resources (320) by applying a predefined inclusion parameter indicative of an acceptable number of candidate web resources of the plurality of candidate web resources to be included into the SERP;

f. generating (512) the SERP for rendering search results in a decreased relevancy order, the generating including adding to a higher-ranked position of the SERP:
   i. the subset of higher-ranked candidate web resources (320);
   ii. the at least one relevant web resource (208) to the search query;

g. receiving (514) user interaction data indicative of a user interaction with a displayed web resource on the SERP, the displayed web resource being one of the at least one of the subset of higher ranked candidate web resources (320) and the at least one relevant web resource (208); and h. storing (516) an indication of the user interaction data in association with the subset of higher ranked candidate web resources (320).

CLAUSE 2. The method of clause 1, wherein the first machine learned algorithm (301) comprises: a third machine learned algorithm (302) and a fourth machine learned algorithm (304):
   i. the third machine learned algorithm (302) to determine a probability of gain (314);
   j. the fourth machine learned algorithm (304) a confidence parameter (316) of the probability of gain (314),
   wherein the probability of gain (314) and the confidence parameter (316) define the predicted relevancy parameter (312).

CLAUSE 3. The method of clause 2, wherein the third machine learned algorithm (302) is a gradient boosted decision trees.

CLAUSE 4. The method of clause 3, wherein the third machine learned algorithm (302) is configured to analyze the web-resource-inherent data (132) to extract web resource-specific features and to use the web resource-specific features of the candidate web resource (128) as an input feature thereto.

CLAUSE 5. The method of clause 2, wherein the fourth machine learned algorithm (304) is configured to receive, at least, the results of predictions of the third machine learned algorithm (302) as an input feature to predict an absolute error of the third machine learned algorithm.

CLAUSE 6. The method of clause 2, further comprising transforming the probability of gain (314) to a mean probability of gain.

CLAUSE 7. The method of clause 6, wherein the transforming is done using an isotonic regression with breaking ties.

CLAUSE 8. The method of clause 6, wherein the second machine learned algorithm (306) is configured to receive as input features, at least:
   k. the mean probability of gain; and
   l. the confidence parameter (316) of the probability of gain (314).

CLAUSE 9. The method of clause 1, wherein a particular one of the set of candidate web resources (129) not having a prior-history feature that can be used by the ranking algorithm (118) comprises a minimal-set of prior history features not sufficient for use by the ranking algorithm, wherein the determining the predicted relevancy parameter 312 for the particular one of the set of candidate web resources (129) comprises determining a second probability of gain, the second probability of gain being based on at least one of (i) a number of prior displays of the particular one of the set of candidate web resources on a prior SERP, (ii) a number of clicks of the particular one of the set of candidate web resources on the prior SERP, and (iii) a posterior probability density parameter.

CLAUSE 10. The method of clause 1, wherein the data indicative of the user interaction with a displayed web resource on the SERP comprises a location of the selected displayed web resource.

CLAUSE 11. The method of claim 1, wherein the storing the indication of the user interaction data in association with the subset of higher ranked candidate web resources (320) comprises storing the indication of the user interaction data with a given candidate web resource and wherein the storing further comprises analyzing the interaction data using a dependent click model (DCM) if the given candidate web resource is located at a ranked position on the SERP that is a same or higher position than the selected displayed web resource.

CLAUSE 12. The method of claim 1, the storing the indication of the user interaction data in association with the subset of higher ranked candidate web resources (320) comprises storing the indication of the user interaction data with a given candidate web resource and wherein the storing further comprises analyzing the interaction data comprises using an expectation-maximization (EM) algorithm, or Bayesian inference, if the given candidate web resource is located at a ranked position on the SERP that is a lower position compared to the selected displayed web resource.

Clause 13. A search engine server (114) configured to execute the method of any one of the clause 1 to clause 12.

The invention claimed is:

1. A method of processing a search query, the method executable by a search engine server, the search engine server implementing a search engine for determining one or more search results to a search query, the search engine server coupled to a crawled web resource database and a communication network, the search engine server accessible by an electronic device associated with a user via the communication network, the method comprising:
- receiving, by the search engine server, the search query from the electronic device associated with a user;
- executing a first ranking process, the first ranking process comprising:
  - executing a ranking algorithm of the search engine server, the ranking algorithm being configured to select at least one relevant web resource to the search query for inclusion into a higher-ranked position of a search engine result page (SERP), the at least one web resource being selected based at least on:
    - a web-resource-inherent data associated with the at least one relevant web resource; and
    - a prior-history feature, the prior-history feature corresponding to previously collected user interaction data associated with the at least one web resource, the user interaction data comprising one or more user interactions with the at least one web resource;
- executing a second ranking process, the second ranking process comprising:
  - acquiring from the crawled web resource database, a plurality of candidate web resources, each candidate web resource of the plurality of candidate web resources having no prior-history feature to be used by the ranking algorithm for inclusion into the higher-ranked position of the SERP;
  - applying a first machine learned algorithm, the first machine learned algorithm being different from the ranking algorithm, to determine, for each of the candidate web resources of the plurality of candidate web resources, a predicted relevancy parameter, the predicted relevancy parameter being based, at least in part, on a respective web-resource-inherent data, the predicted relevancy parameter being indicative of a predicted relevancy of the respective candidate web resource to the search query;
  - applying a second machine learned algorithm to determine, for each of the plurality of candidate web resources, an exploration score based at least in part of the respective predicted relevancy parameter, and inputting the determined exploration score of the plurality of candidate web resources into a bandit-based-ranking algorithm for:
    - ranking the plurality of candidate web resources;
    - selecting a subset of higher-ranked candidate web resources by applying a predefined inclusion parameter indicative of an acceptable number of candidate web resources of the plurality of candidate web resources to be included into the SERP;
- generating the SERP for rendering search results in a decreased relevancy order, the generating including adding to the higher-ranked position of the SERP:
  - the subset of higher ranked candidate web resources determined by the second ranking process;
  - the at least one relevant web resource to the search query determined by the first ranking process;
- receiving user interaction data with a displayed web resource on the SERP, the displayed web resource being one of the at least one of the subset of higher ranked candidate web resources and the at least one relevant web resource; and
- storing an indication of the user interaction data in association with the subset of higher ranked candidate web resources.

2. The method of claim 1, wherein the first machine learned algorithm comprises: a third machine learned algorithm and a fourth machine learned algorithm:
- the third machine learned algorithm to determine a probability of gain;
- the fourth machine learned algorithm a confidence parameter of the probability of gain,
  - wherein the probability of gain and the confidence parameter define the predicted relevancy parameter.

3. The method of claim 2, wherein the third machine learned algorithm is a gradient boosted decision trees.

4. The method of claim 3, wherein the third machine learned algorithm is configured to analyze the web-resource-inherent data to extract web resource-specific features and to use the web resource-specific features of the candidate web resource as an input feature thereto.

5. The method of claim 2, wherein the fourth machine learned algorithm is configured to receive, at least, the results of predictions of the third machine learned algorithm as an input feature to predict an absolute error of the third machine learned algorithm.

6. The method of claim 2, further comprising transforming the probability of gain to a mean probability of gain.

7. The method of claim 6, wherein the transforming is done using an isotonic regression with breaking ties.

8. The method of claim 6, wherein the second machine learned algorithm is configured to receive as input features, at least:
- the mean probability of gain; and
- the confidence parameter of the probability of gain.

9. The method of claim 1, wherein a particular one of the set of candidate web resources having no prior-history feature to be used by the ranking algorithm comprises a minimal-set of prior history features not sufficient for use by the ranking algorithm to position the particular one of the set of candidate web resources to a higher-ranked position of the SERP, wherein the determining the predicted relevancy parameter for the particular one of the set of candidate web resources comprises determining a second probability of gain, the second probability of gain being based on at least one of (i) a number of prior displays of the particular one of the set of candidate web resources on a prior SERP, (ii) a number of clicks of the particular one of the set of candidate web resources on the prior SERP, and (iii) a posterior probability density parameter.

10. The method of claim 1, wherein the data indicative of the user interaction with a displayed web resource on the SERP comprises a location of the selected displayed web resource.

11. The method of claim 1, wherein the storing the indication of the user interaction data in association with the subset of higher ranked candidate web resources comprises storing the indication of the user interaction data with a given candidate web resource and wherein the storing further comprises analyzing the interaction data using a dependent click model (DCM) if the given candidate web resource is located at a ranked position on the SERP that is a same or higher position than the selected displayed web resource.

12. The method of claim 1, the storing the indication of the user interaction data in association with the subset of higher ranked candidate web resources comprises storing the indication of the user interaction data with a given candidate web resource and wherein the storing further comprises analyzing the interaction data comprises using an expectation-maximization (EM) algorithm, or Bayesian inference, if the given candidate web resource is located at a ranked position on the SERP that is a lower position compared to the selected displayed web resource.

13. A search engine server coupled to a crawled web resource database and a communication network, the search engine server implementing a search engine for determining one or more search results to a search query, comprising:
a communication interface configured to communicate with an electronic device associated with a user via the communication network;
at least one computer processor operationally connected with the communication interface, configured to:
receive, by the search engine server, the search query from the electronic device associated with a user;
execute a first ranking process, wherein the at least one computer processor is configured to:
execute a ranking algorithm of the search engine server, the ranking algorithm being configured to select at least one relevant web resource to the search query for inclusion into a higher-ranked position of a search engine result page (SERP), the at least one web resource being selected based at least on:
a web-resource-inherent data associated with the at least one relevant web resource; and
a prior-history feature, the prior-history feature corresponding to previously collected user interaction data associated with the at least one web resource, the user interaction data comprising one or more user interactions with the at least one web resource;
execute a second ranking process, wherein the at least one computer processor is configured to:
acquire from the crawled web resource database, a plurality of candidate web resources, each candidate web resource of the plurality of candidate web resources having no prior-history feature to be used by the ranking algorithm for inclusion into the higher-ranked position of the SERP;
apply a first machine learned algorithm, the first machine learned algorithm being different from the ranking algorithm, to determine, for each of the candidate web resources of the plurality of candidate web resources, a predicted relevancy parameter, the predicted relevancy parameter being based, at least in part, on a respective web-resource-inherent data, the predicted relevancy parameter being indicative of a predicted relevancy of the respective candidate web resource to the search query;
apply a second machine learned algorithm to determine, for each of the plurality of candidate web resources, an exploration score based at least in part of the respective predicted relevancy parameter, and inputting the determined exploration score of the plurality of candidate web resources into a bandit-based-ranking algorithm for:
ranking the plurality of candidate web resources;
selecting a subset of higher-ranked candidate web resources by applying a predefined inclusion parameter indicative of an acceptable number of candidate web resources of the plurality of candidate web resources to be included into the SERP;
generate the SERP for rendering search results in a decreased relevancy order, the generating including adding to a higher-ranked position of the SERP:
the subset of higher ranked candidate web resources determined by the second ranking process;
the at least one relevant web resource to the search query determined by the first ranking process;
receive user interaction data indicative with a displayed web resource on the SERP, the displayed web resource being one of the at least one of the subset of higher ranked candidate web resources and the at least one relevant web resource; and
store an indication of the user interaction data in association with the subset of higher ranked candidate web resources.

14. The search engine server of claim 13, wherein the first machine learned algorithm comprises: a third machine learned algorithm and a fourth machine learned algorithm:
the third machine learned algorithm to determine a probability of gain;
the fourth machine learned algorithm a confidence parameter of the probability of gain,
wherein the probability of gain and the confidence parameter define the predicted relevancy parameter.

15. The search engine server of claim 14, wherein the third machine learned algorithm is a gradient boosted decision trees.

16. The search engine server of claim 15, wherein the third machine learned algorithm is configured to analyze the web-resource-inherent data to extract web resource-specific features and to use the web resource-specific features of the candidate web resource as an input feature thereto.

17. The search engine server of claim 14, wherein the fourth machine learned algorithm is configured to receive, at least, the results of predictions of the third machine learned algorithm as an input feature to predict an absolute error of the third machine learned algorithm.

18. The search engine server of claim 14, the processor being further configured to transform the probability of gain to a mean probability of gain.

19. The search engine server of claim 18, wherein the transforming is done using an isotonic regression with breaking ties.

20. The search engine server of claim 18, wherein the second machine learned algorithm is configured to receive as input features, at least:
the mean probability of gain; and
the confidence parameter of the probability of gain.

* * * * *